Aug. 7, 1945.　　　J. W. LEWIN　　　2,381,064
PIPE BENDER
Filed March 1, 1943　　　2 Sheets-Sheet 1
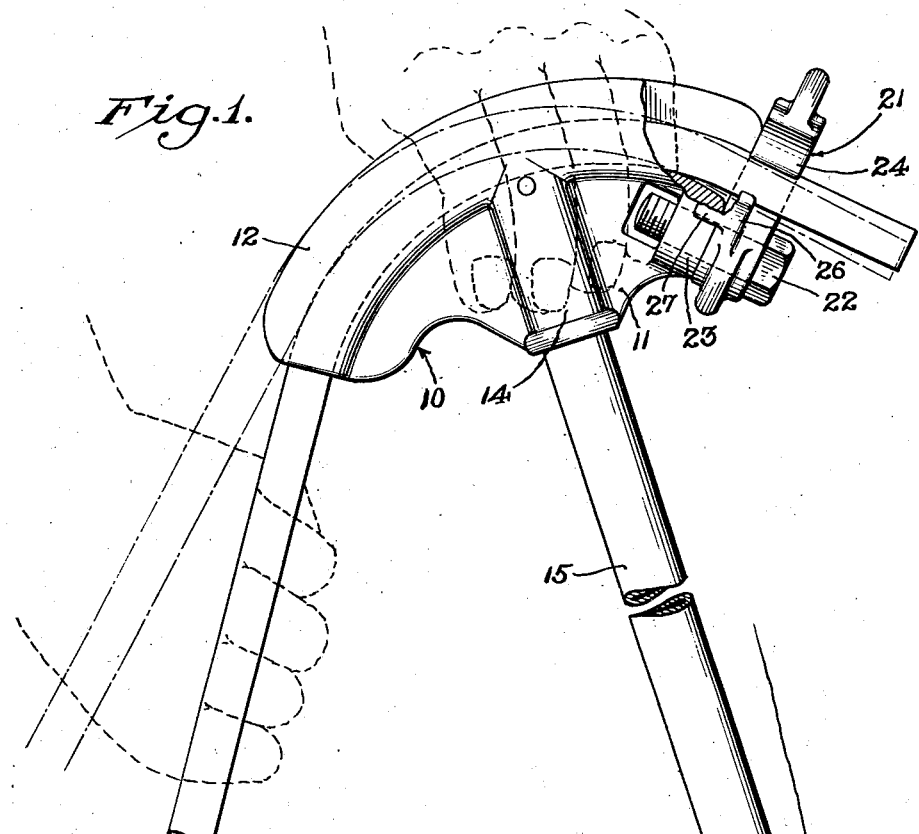
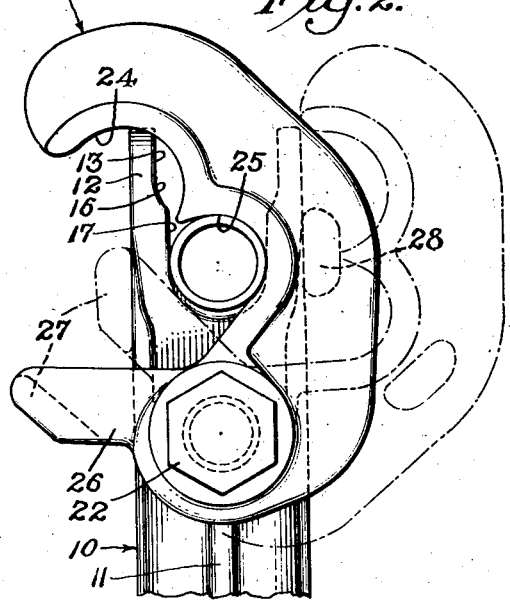
Inventor
Jacob W. Lewin
BY
Parker, Carlson, Pitzner & Hubbard
Attorneys.

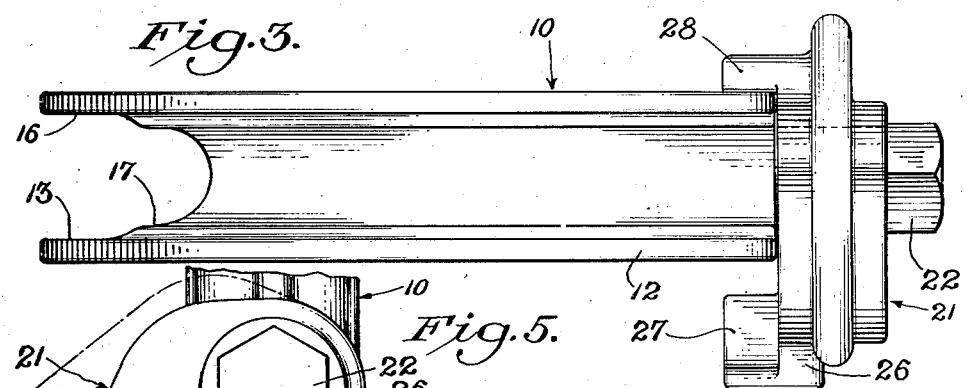
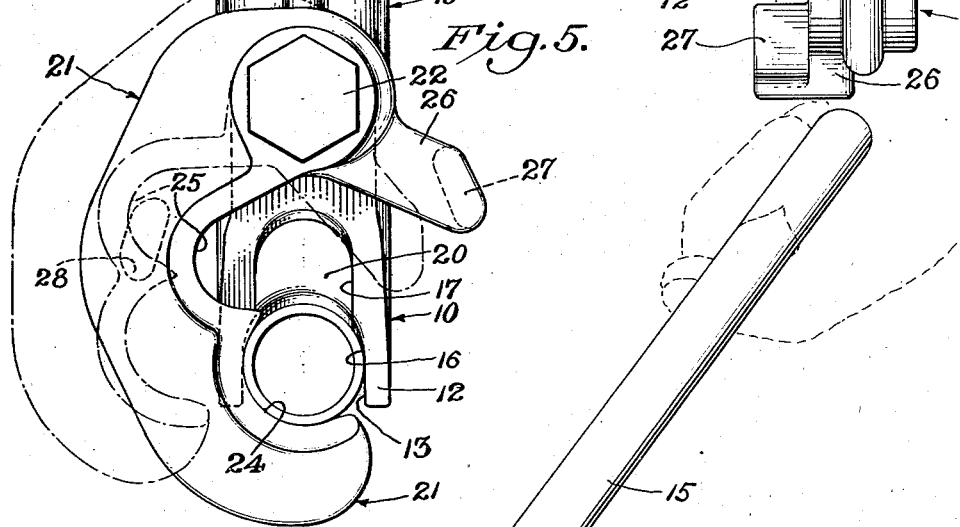
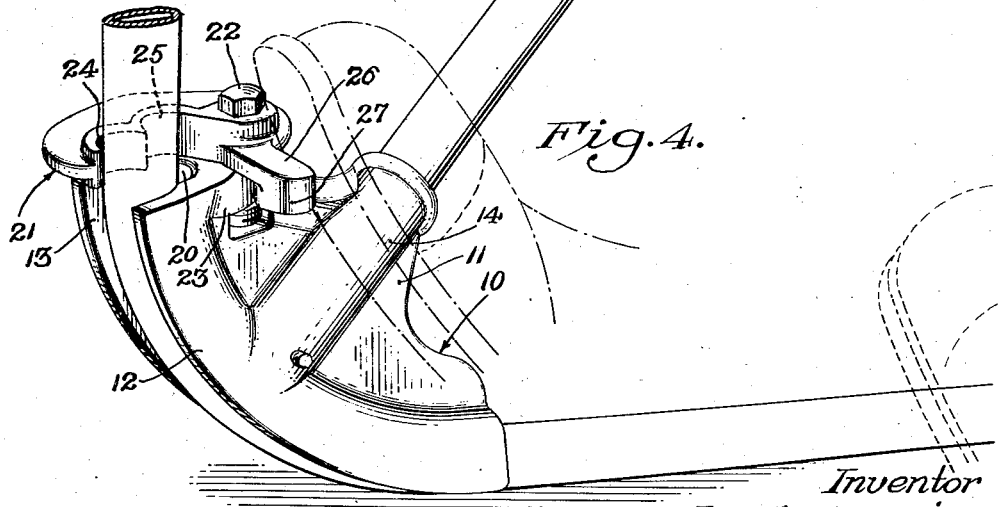

Patented Aug. 7, 1945

2,381,064

UNITED STATES PATENT OFFICE 2,381,064

PIPE BENDER

Jacob W. Lewin, Oak Park, Ill.

Application March 1, 1943, Serial No. 477,498

3 Claims. (Cl. 81—15)

The invention relates generally to a device for bending pipe or the like and more particularly to a hand bender adapted especially for bending electrical conduit.

The general object of the invention is to provide a pipe bender which is so constructed as to facilitate the insertion of pipe into the bender and the removal therefrom after the pipe is bent.

More particularly, it is an object to provide a bender comprising an arcuately grooved member into which the pipe is bent, and removable retaining means for holding the pipe in position, which means is constructed so that it tends to move to a releasing position after the pipe is bent, when the bender is held in one position for bending, and so that it may be readily released by the foot when the bender is held in another position for bending, said means being limited in its movement so that only slight movement thereof is required to shift it from its released to its holding position.

Other objects and advantages will become apparent from the following description taken in connection with the accompanying drawings, in which:

Figure 1 is a side elevational view of a pipe bender embodying the features of the invention and showing one mode of use of the bender.

Fig. 2 is a fragmentary view of the bender taken at the right-hand end of Fig. 1.

Fig. 3 is a plan view of the bender when positioned as in Fig. 1.

Fig. 4 is a perspective view of the bender showing another mode of use and also showing the bender when used with a different size of pipe.

Fig. 5 is an end view of the bender of the upper end as shown in Fig. 4.

While the invention is susceptible of various modifications and alternative constructions, I have shown in the drawings and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

A pipe bender, in which may be embodied the features of the invention, is of the type comprising a body member having an arcuately shaped edge provided with a groove into which the pipe is bent, the arc of the groove determining the curvature of the bend put in the pipe. A bender of this type is shown in my Patent No. 2,233,292, dated February 25, 1941.

The present invention contemplates a bender of the foregoing type with a retaining means for holding the pipe in the groove, of such character that it is readily shifted out of engagement with the pipe but is prevented from moving beyond a position adjacent the pipe so that it may readily be reengaged. Pipe benders of the foregoing type are used in different positions, depending upon the preference of the user and the size of pipe. The retaining means disclosed herein is arranged so that when the bender is held with its groove upwards, the retaining means tends by gravity to swing to its disengaged position. Such position of the bender is one that is frequently used when a small size pipe is bent, for example, a half-inch pipe. When the bender is held with its groove downward and the length of pipe lies on the floor or ground, the retaining means is so constructed that the user may place his foot on the retaining means and readily force it to the disengaged position. Such position of the bender is one that is frequently used when a larger size of pipe, say three-quarter inch, is bent.

A retaining means embodying the features of the invention comprises generally a member pivotally supported on the body of the bender for swinging movement crosswise of the groove. The retaining member is of hook-like form to engage the pipe when in the groove. Because of such hook-like form, most of the weight of the retaining member is located on one side of the plane through the pivotal axis and the groove so that the retaining member tends to fall away from the groove by gravity. In order that the retaining member may be readily available for reengagement with the pipe, a stop means is provided which limits the movement of the retaining member. Preferably the stop means comprises an arm on the retaining member having a lug adapted to engage the side of the body member of the bender, thus limiting the swinging movement. Such arm and lug are so positioned that when the bender is used with its groove downward, the arm and its lug afford a part on which the user's foot may conveniently be placed to force the retaining member to its disengaged position. The stop means also includes another lug on the retaining member adapted to engage the other face of the body of the pipe bender so that the retaining member cannot swing beyond its pipe-engaging position. Thus the retaining member can move only between its pipe-engaging position and a position where it is readily available for reengagement. The manipulation of the bender is thereby materially facilitated.

As mentioned above, the present invention may be embodied in a bender of the type shown in my prior patent. I have therefore shown in the present application a bender of this type. Such bender comprises a body member, indicated generally at 10, of generally sector shape comprising a central web portion 11 having a flanged edge portion 12 of arcuate form providing a groove 13 therein. The groove 13 is adapted to receive the pipe at one end before the pipe is bent, and the bending operation causes the pipe to be bent into the groove, the arc of the groove determining the arc of the bend in the pipe. At one end of the groove is a retaining means for holding the pipe therein, and the pipe is bent around and into the groove by the user's pressing downwardly on the pipe when the bender is held with the groove upward, as shown in Fig. 1, or by turning the bender through the required angle when the groove is downward and the pipe is laid on the floor, as shown in Fig. 4. To readily turn the bender through such an angle when the groove is downward, or to support the bender when the groove is upward, the web portion 11 is enlarged, as at 14, and provided with a socket extending radially of the arc of the body member to receive a handle 15.

The bender, like the bender of my prior patent, is arranged so that two sizes of pipe may be bent therein, and to this end the groove 13 comprises an outer portion 16 suitable to receive one size of pipe, and an inner portion 17 suitable to receive a smaller size of pipe. When the larger size of pipe is bent in the portion 16, an adapter or insert 20 is placed in the inner portion 17 and is so shaped as to provide a surface complementary to the surface of the portion 16, thus providing a rigid bottom for the larger portion 16.

As mentioned above, the present invention contemplates a retaining means for this type of bender, which is so constructed as to greatly facilitate the use of the bender. In the preferred embodiment, the retaining means comprises a member, indicated generally at 21, supported for shiftable movement on the body member 10 and adapted to be swung from a position free of the pipe to a position engaging the pipe and holding it within the groove 13. Preferably the shifting movement of the member 21 is crosswise of the groove, and to so support the member it is mounted on a pivot extending parallel to a tangent to the groove at the end thereof. Thus in the present instance the member 21 is pivotally supported on a screw 22 threaded into a boss 23 formed on the web portion 11 of the body member. The retaining member 21 is preferably of hook-like form. Since in the present instance the bender is arranged to accommodate two different sizes of pipe, the retaining member 21 is provided with an outer hook-like notch 24 shaped to contact a pipe of larger diameter, and an inner notch 25 shaped to engage a pipe of smaller diameter, the two notches 24 and 25 being suitably spaced to aline with the portions 16 and 17 of the groove.

One of the principal advantages of a retaining member embodying the features of the invention is the fact that it may readily be moved from its pipe-engaging position to a disengaged position, thus greatly facilitating its use. To this end the retaining member 21, being of hook-like form, has its greatest weight on one side of its pivotal axis. That is, as shown in Fig. 2, the main mass of the retaining member 21 is to the right of a plane through its axis so that the retaining member tends by gravity to swing to its disengaged position when the bender is held in the position shown in Fig. 1. In this position, the groove faces upward and, as the pipe is bent downwardly into the groove, it bears against the upper portion of the notch for the proper size of pipe being bent, and keeps the retaining member 21 from swinging to one side. Such position of bending is frequently utilized for the smaller size of pipe, for instance, the size of pipe that fits within the portion 17 of the groove. Thus the notch 25 of the retaining member engages the pipe. After the pipe is bent and it is raised slightly in the groove, the pressure against the retaining member 21 is thereby released and the retaining member falls by gravity to one side, that is, to the right in Fig. 2, as illustrated in dot and dash lines in said figure.

Another advantage contemplated by the invention is to so construct the retaining member 21 that it is permitted to swing sufficiently to free the pipe but still be held closely adjacent thereto so that it may readily be moved back to pipe-retaining position. To this end stop means are provided either on the retaining member or the body member to contact the other to prevent the retaining member from swinging beyond only what is sufficient to permit convenient removal of the pipe. In the preferred embodiment, the retaining member is provided with an arm 26 extending to one side of the body member 10 and including a lug 27 on its end adapted to engage the side face of the body. The lug is so positioned relative to the hook portion of the retaining member that when the lug is in contact with the body member, the hook is free of the pipe but closely adjacent the groove, as indicated in dash and dot lines in Fig. 2, so that it may readily reengage the pipe.

To prevent the retaining member 21 from swinging too far the other way, that is, beyond the position of engagement with the pipe, the hook portion of the retaining member is provided with a second lug 28 adapted to engage the other face of the body member 10. Thus the swinging movement of the retaining member is limited to such movement as is necessary to move from pipe-engaging position to the disengaged position. Any movement of the retaining member beyond that limit would require greater manipulation on the part of the operator in using the bender.

In bending larger sized pipe, that is, the size of pipe adapted to fit in the outer portion 16 of the groove, the bender is frequently used with its groove opening downwardly, as shown in Fig. 4, and with the pipe lying on the floor or ground. Thus when the pipe is clamped in the end of the groove by means of the notch 24 in the retaining member 21, the user can exert sufficient force on the handle 15 to turn the bender and consequently form the bend in the pipe, as shown in Fig. 4. To facilitate release of the pipe, the bender is turned back slightly to free the pressure of the pipe against the retaining member 21. In such position the arm 26, with its lug 27, extends toward the operator and provides a convenient place for the operator to place pressure through his foot onto the retaining member to shift it to the pipe releasing position.

From the foregoing, it will be evident that I have provided a novel pipe bender which is so constructed as to facilitate the insertion of the pipe into the bender and removal therefrom after the pipe is bent. When the straight pipe is put into the bender, the retaining means is held closely adjacent the pipe so that by just a small movement it will engage the pipe. When the bender is used with its groove upwardly, the retaining means falls by gravity to its pipe releasing position as soon as the bend is completed. When the bender is used with its groove downwardly, the retaining means is readily released merely by the operator's placing his foot on the arm 26 to swing the retaining member out of the way.

I claim as my invention:

1. A pipe bender comprising, in combination, a body member having an arcuately-shaped edge provided with a groove to receive the pipe, a gravity hook eccentrically pivoted to said member at one end of said groove for swinging movement on an axis in the plane which bisects the width of said groove and substantially parallel to a tangent to said groove at said one end, said hook being movable about said axis selectively into open position immediately at one side of said groove to permit insertion or removal of the pipe or into closed position in alinement with said end of said groove to retain the pipe therein, the center of gravity of said hook being located at one side of said plane whereby to cause said hook normally to drop into open position when said bender is held with said groove facing upwardly, a finger projecting from said hook generally laterally of said member and adapted for manual engagement to swing said hook, a lug on said hook adapted for engagement with one side of said body member to prevent over-travel of said hook in one direction beyond said closed position, and a lug on said finger adapted for engagement with the other side of said body member to define said open position.

2. A pipe bender comprising, in combination, a body member having an arcuately-shaped edge provided with a groove to receive the pipe, a gravity hook eccentrically pivoted to said member at one end of said groove for swinging movement on an axis substantially parallel to a tangent to said groove at said one end, said hook being movable about said axis selectively into open position immediately at one side of said groove to permit insertion or removal of the pipe or into closed position in alinement with said end of said groove to retain the pipe therein, the center of gravity of said hook being located at one side of a plane of said axis between the sides of said groove and parallel to the plane which bisects the width of said groove whereby to cause said hook normally to drop into open position when said bender is held with said groove facing upwardly, a finger projecting from said hook generally laterally of said member and adapted for manual engagement to swing said hook, and stop means on said hook projecting therefrom generally longitudinally of said groove into overlapping side relation with said body member and adapted in the swinging movement of said hook to engage said member whereby to define said open position.

3. A pipe bender comprising, in combination, a body member having an arcuately-shaped edge provided with a groove to receive the pipe, a gravity hook eccentrically pivoted to said member at one end of said groove for swinging movement on an axis substantially parallel to a tangent to said groove at said one end, said hook being movable about said axis selectively into open position immediately at one side of said groove to permit insertion or removal of the pipe or into closed position in alinement with said end of said groove to retain the pipe therein, the center of gravity of said hook being located at one side of a plane of said axis between the sides of said groove and parallel to the plane which bisects the width of said groove whereby to cause said hook normally to drop into open position when said bender is held with said groove facing upwardly, and stop means on said hook projecting therefrom generally longitudinally of said groove into overlapping side relation with said body member and adapted in the swinging movement of said hook to engage said member whereby to define said open position.

JACOB W. LEWIN.